United States Patent [19]

Schwartz et al.

[11] Patent Number: 4,690,697
[45] Date of Patent: Sep. 1, 1987

[54] LONG RESIDENCE POLLUTION CONTROL SYSTEM

[76] Inventors: Arthur G. Schwartz, 1119 Smyrna Ct., Sunnyvale, Calif. 94087; Richard M. Gurries, 19314 Vineyard Ln., Saratoga, Calif. 95070; Jay K. Johnson, P.O. Box 137, La Honda, Calif. 97020

[21] Appl. No.: 831,295

[22] Filed: Feb. 20, 1986

[51] Int. Cl.⁴ .............................................. B01D 47/00
[52] U.S. Cl. ............................................ 55/84; 55/220; 55/312; 55/233; 47/17; 261/119.1; 423/220; 423/234; 423/235; 423/242; 423/437
[58] Field of Search .......... 55/84, 89, 94, 220, 55/227, 312, 233, 259; 47/17; 261/119; 423/220, 234, 235, 242, 437

[56] References Cited

U.S. PATENT DOCUMENTS

| | | | |
|---|---|---|---|
| 3,274,730 | 9/1966 | Bose | 47/1 R |
| 3,713,277 | 1/1973 | Sackett | 55/259 |
| 3,999,329 | 12/1976 | Brais | 55/385 R |
| 4,003,160 | 1/1977 | Muller | 47/17 |
| 4,073,089 | 2/1978 | Maginnes et al. | 47/17 |

FOREIGN PATENT DOCUMENTS

| | | | |
|---|---|---|---|
| 28565 | 12/1924 | France | 55/220 |
| 114303 | 2/1969 | United Kingdom | 47/17 |

Primary Examiner—Bernard Nozick
Attorney, Agent, or Firm—Wigman & Cohen

[57] ABSTRACT

Method and apparatus for removing noxious gases, such as, oxides of nitrogen, sulfur or carbon from industrial influent gas streams which utilizes growing plants positioned in long residence contact time apparatus for removing the noxious gases.

12 Claims, 6 Drawing Figures

LONG RESIDENCE POLLUTION CONTROL SYSTEM

BACKGROUND OF THE INVENTION

1. Field of the Invention

This invention relates to the removal of noxious components, such as nitrogen oxides, sulfur oxides, particulate matter and carbon monoxide, from effluent gases produced by industrial processes for purposes of meeting air quality standards and air pollution emission regulations.

Existing scrubbers utilize short residence times, on the order of less than 5 seconds, and high energy levels to achieve intimate contact between noxious molecules in the gas and the scrubbing liquid intended to remove these molecules so as to reduce equipment size and cost and meet space limitations. Because of the short residence time, certain innovative removal processes cannot be made to work effectively.

Since the time required to achieve complete reaction is directly related to the chemical concentration, existing short residence time scrubbers can only work effectively at higher concentrations of noxious components and involve complex reactions requiring high concentrations of chemicals in the liquid to effect removal of the noxious components. The high concentrations of these chemicals increase the operational costs and produce byproducts that are either difficult to dispose of or to sell.

Additionally, the manufacturing cost of short residence time scrubbers is very high due to the need for high strength, rigid, corrosion-resistant materials required to meet the high pressure, high energy conditions within the scrubber and to withstnad the corrosive effect of the high concentrations of reactive chemicals.

2. Description of the Prior Art

U.S. Pat. No. 3,701,235 discloses a method and apparatus for removing foreign constituents from a gas by inducing flow of the gas through an elongated, inflatable treatment chamber and washing and drying the gas as it passes therethrough. The composition of the washing liquid is not described although water is mentioned or inferred in most of the claims.

U.S. Pat. No. 4,164,547 describes a process for removing sulfur dioxide from waste gas from coal and liqnite combustion in a wet scrubber incorporating a control system to maintain suitable levels of alkali reactants produced from fly ash, e.g. calcium, sodium and magnesium ions.

U.S. Pat. No. 4,325,713 describes a process and apparatus for removal of sulfur oxides and fly ash particulates incorporating an absorber and a spray dryer and utilizing complex chemical reactions utilizing sodium hydroxide, sodium carbonate and sodium bicarbonate.

U.S. Pat. No. 4,228,139 describes a process for removing sulfur oxides from flue gas utilizing a high ionic strength slurry produced from the fly ash of coal fired boilers maintained at a pH of about 4 and incorporating a venturi and multiple spray chamber scrubber.

U.S. Pat. No. 4,002,724 describes a method for removing sulfur dioxide from waste gas utilizing a slurry produced from the fly ash from lignite based fuel combustion and incorporating particle size classification and size reduction equipment.

U.S. Pat. No. 3,632,306 describes a process for removing sulfur oxides from waste gas utilizing a slurry containing calcium, magnesium and barium oxide or carbonate particles with an acidic radical additive.

U.S. Pat. No. 3,708,266 describes an apparatus for removing sulfur dioxide from flue gas utilizing an absorbent slurry and incorporating a grinding mill to reactivate the particles in a recycled slurry.

U.S. Pat. No. 3,520,649 describes a typical apparatus for removing sulfur oxides utilizing a limestone or dolomite slurry in a spray drier type apparatus.

From the foregoing, it will be clear that there still exists a need for a low cost, economical system which effectively removes noxious gases, particularly nitrogen oxides, from industrial effluent gaseous waste streams.

SUMMARY OF THE INVENTION

An object of this invention is to provide a gas purification system with a long residence time, e.g. from about 1 to 20 minutes, to enable use of a process which eliminates the need for purchase of chemicals for use in the scrubbing liquid while simultaneously reducing the energy requirements associated with low residence time scrubbers and the cost of waste disposal.

Another object of this invention, which results from the long residence time system, is to permit an alternate process to be utilized which removes the noxious components from the gaseous stream by a means other than scrubbing with a liquid, thus eliminating all purchase and waste disposal costs which are associated with chemical scrubbing processes while also reducing the high energy costs associated with intimate mixing of liquid and gas streams.

Yet another object of this invention is to use less expensive construction for the scrubber or to enable it to serve as a roof structure over other processes and apparatus.

Still another object is to provide a method and apparatus utilizing growing plants to remove noxious components from gaseous streams.

These and other objects will become more apparent from the description and drawings which follow.

The apparatus of the present invention comprises one or a plurality of greenhouses or other simple structures of large volume, covering a large area, and optimally including a membrane-lined basin. The apparatus can be mounted on the ground, placed over a basin dug into the ground, or supported on a structure above the ground. The structure is preferably divided into a plurality of chambers. Alternately, multiple structures can be utilized to provide for a serial arrangement for staged removal to increase removal efficiency or for a parallel arrangement to permit off-line operations and maintenance. A combination of serial and parallel arrangements can also be used.

In one embodiment, plants can be grown within the structure either in soil or hydroponically in an aqueous medium. The plants take up noxious fumes, e.g. sulfur oxides, nitrogen oxides, from the gas stream. Plant growth rate is stimulated by low concentrations of nitrogen and sulfur oxides, particularly when the soils in which they are planted are deficient in these elements. Harvested plants can be used as fuel for an associated combustion system, or sold for feed or other purposes, or a combination thereof. This process can also be combined with other processes to cool the combustion gases to a suitable temperature and to remove some of the noxious components before or after the plant growing unit. For example, incoming gases can be cooled with water by means of sprays or water-saturated porous or fibrous media, via evaporation of the water.

In another embodiment of the process, a system of sprays or wetted fibrous or other media cna be utilized to permit intimate, low energy contact between a chemical solution and the molecules of the noxious components. The chemical solution prefereably is obtained by leaching potassium hydroxide, other alkaline earth hydroxides, and other soluble chemicals from the ash of a combustion process to which the described apparatus is attached or such other source of alkaline ash as may be readily available. The leaching step can optimally be carried out in other suitable apparatus or in pits dug in the ground.

In yet another embodiment, the two processes described are combined in a series arrangement which provides for maximum removal of all noxious components of the gas stream.

DESCRIPTION OF THE PREFERRED EMBODIMENTS

Figure 1:
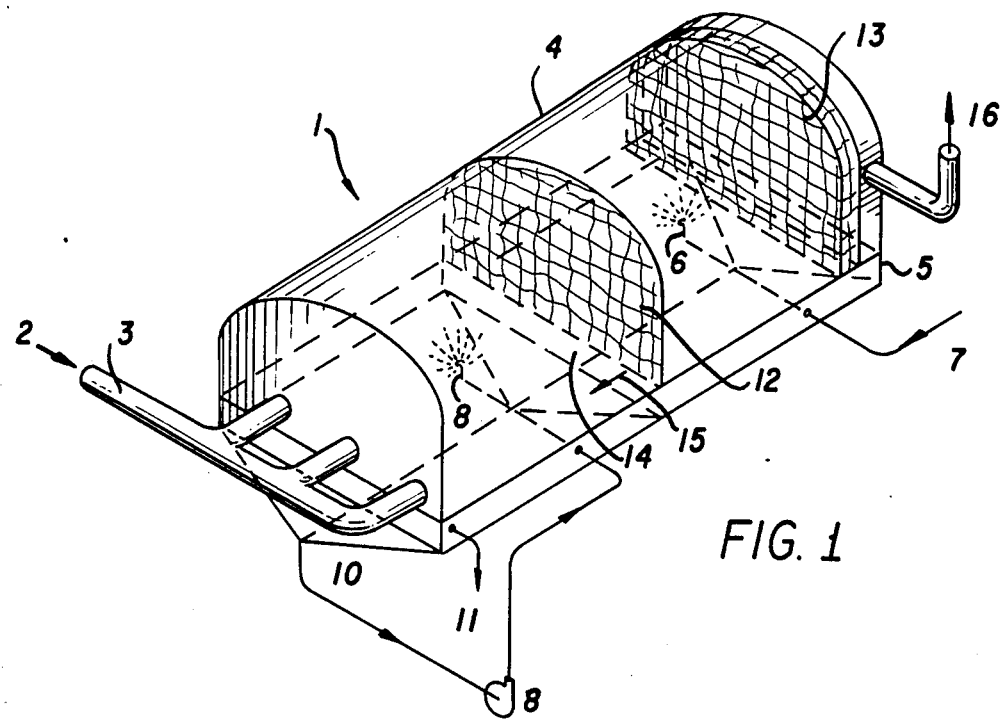
FIG. 1 is a perspective view of one embodiment of the invention showing an apparatus comprising a tunnel-like structure including liquid spray means for gas cleaning using ash leachate.

FIG. 1 illustrates a gas cleaning apparatus 1 which according to this invention permits removal of noxious components from the gas stream 2 emitted from an industrial process, such as a wood-fired combustion system. Gas stream 2 enters the apparatus 1 through one or more inlets 3 so as to provide the required distribution of gases within the apparatus 1. Apparatus 1 comprises a suitable covering 4 over a base 5, the combination of which provides an enclosed volume of suitable size to produce long residence times, in excess of one minute, for the gases flowing through the apparatus. Following removal of the noxious components by means of a suitable process contained within the apparatus, the cleaned gases exit the apparatus through a discharge 16.

In this embodiment the covering 4 consists a flexible or rigid sheeting material supported by an internal or external structure (not shown), or a rigid self-supporting sheeting material. Base 5, which may incorporate drains or other features required for the gas cleaning process, may be a rigid container fabricated from suitable rigid materials, such as plastic or metal sheeting or concrete, or a flexible sheeting material supported by a suitable structure frame. The base 5, as shown, is mounted upon the ground.

Suitable gas cleaning equipment such as one or more liquid spray nozzles 6, 8 cause contact between the sprayed liquid and the incoming gas streams. In a typical configuration, one or more nozzles 6 might be connected to a source of water or a chemical solution 7 and one or more nozzles 8 connected to a pump 9 which recirculates liquid from the base 10, with excess liquid 11 overflowing from the base to a suitable disposal system. Vertical screens or baffles 12 are positioned to improve the contact between the liquid and gas within the apparatus, or to control air flow between multiple chambers, if so equipped, and a filter media or other suitable mist eliminator device 13. Multiple chambers are separated by a liquid baffle 14 with an overflow device 15 to control liquid flow between chambers in a direction usually counter to that of the air flow.

Figure 2:
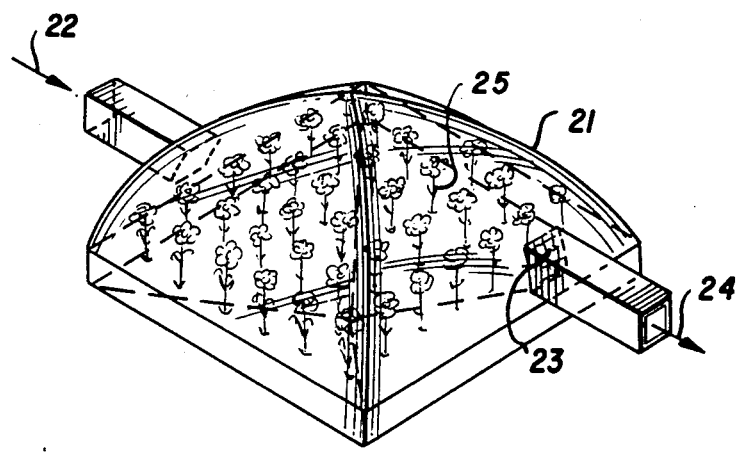
FIG. 2 is a perspective view showing an alternate embodiment of the gas purification apparatus suitable for the growing of plants.

FIG. 2 illustrates an alternate embodiment which uses an inflatable flexible sheet material as the cover 21. The energy to maintain the covering in an inflated condition is provided by the pressure of the incoming gas stream 22 and is controlled by a suitable flow restricting device 23 located in the exit gas stream 24, the pressure being supplied either by the incoming gas or by a fan (not shown). Within the cover 21 are growing plants or trees 25, which take up the noxious components from the gas stream.

Figure 3:
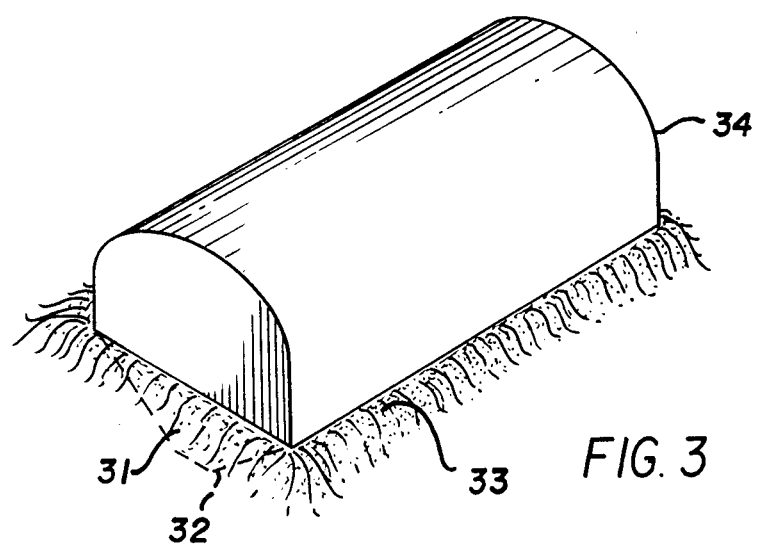
FIG. 3 is a perspective view showing an alternate embodiment of the apparatus of FIG. 1 incorporating a pit dug from the earth to provide the basin for a liquid scrubbing process.

FIG. 3 illustrates another embodiment which utilizes a pit 31 dug into the earth and optimally utilizing a suitable liquid-tight liner 32. A berm 33 is preferably formed utilizing the earth dug out to form the pit. The covering 34 may consist of any of the previously described materials. Alternately, the pit can be positioned adjacent to an existing irrigation canal or the cover 34 can be positioned over an existing irrigation canal suitably modified to permit controlled entry and exit of the gas and liquid streams. Such a canal system would be most economical to install and operate when the water flowing through the canal was used solely for agricultural irrigation purposes since the reactin products from the leachate scrubbing process described below are of value as fertilizer, in particular the nitrogen and sulfur compounds.

Figure 4:
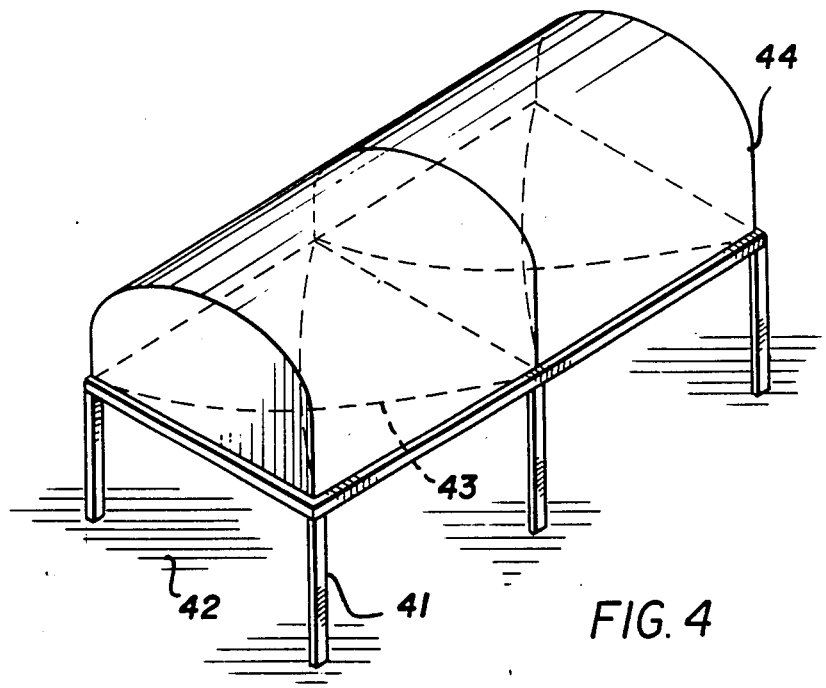
FIG. 4 is a perspective view showing an alternate embodiment of the apparatus of FIG. 1 built above the ground and utilizing structural supports for a rigid or flexible basin and a rigidly supported or inflated covering.

FIG. 4 illustrates another embodiment in which the base and covering are supported above the ground on a suitable rigid structure 41 enabling the apparatus to serve as a roof over a parking lot, storage yard, or industrial process 42. The base of the apparatus 43 may consist of a rigid or flexible material depending on the type of gas cleaning process utilized within the apparatus. The covering 44 is as previously described.

A primary feature of all the above preferred embodiments of the present invention is the provision of influent gas residence times on the order of 1 to 20 minutes at low cost enabling gas cleaning processes to be utilized which will not work in existing small scrubber systems. These long residence times permit a number of chemical reactions to occur. One such reaction is the oxidation of nitric oxide (NO) to nitrogen dioxide ($NO_2$). This reaction will continuously and slowly occur at concentrations above about 10 parts per million (ppm) providing that the $NO_2$ is continuously removed from the gas. Cleaning solutions containing potassium or other alkaline earth hydroxides can readily remove nitrogen dioxide from the influent gas stream.

Alternately, plants continually and slowly take up nitrogen oxides. Sulfur dioxide $SO_2$ will oxidize slowly and steadily to sulfur trioxide ($SO_3$) in the presence of moisture. The sulfur trioxide is very soluble in water forming sulfuric acid. Carbon monoxide reacts slowly with nitric oxide and oxygen to form carbon dioxide and nitrogen dioxide. Both carbon and nitrogen dioxides are readily removed by leachate scrubbing. Alternately, these compounds are readily taken up by growing plants as are sulfur dioxide and sulfur trioxide.

The following non-limiting illustrations show two processes which take advantage of this long residence time and the above reactions to eliminate the need for high enegy contact between molecules of the noxious gas and droplets of liquid and to overcome the slow diffusion that occurs in gasses, that is, the slow movement of the noxious molecules to the point of contact with the liquid or the growing plants.

A typical wood waste boiler producing 60,000 pounds/hour of steam emits about 45,000 cubic feet per minute of exhaust gases. Providing a residence time of 15 minutes would require a structure 15 feet high and covering an area of 45,000 square feet or approximately one acre. Multiple connected chambers would be used to provide structural integrity and control gas flow to provide uniformity of flow through the device.

Figure 5:
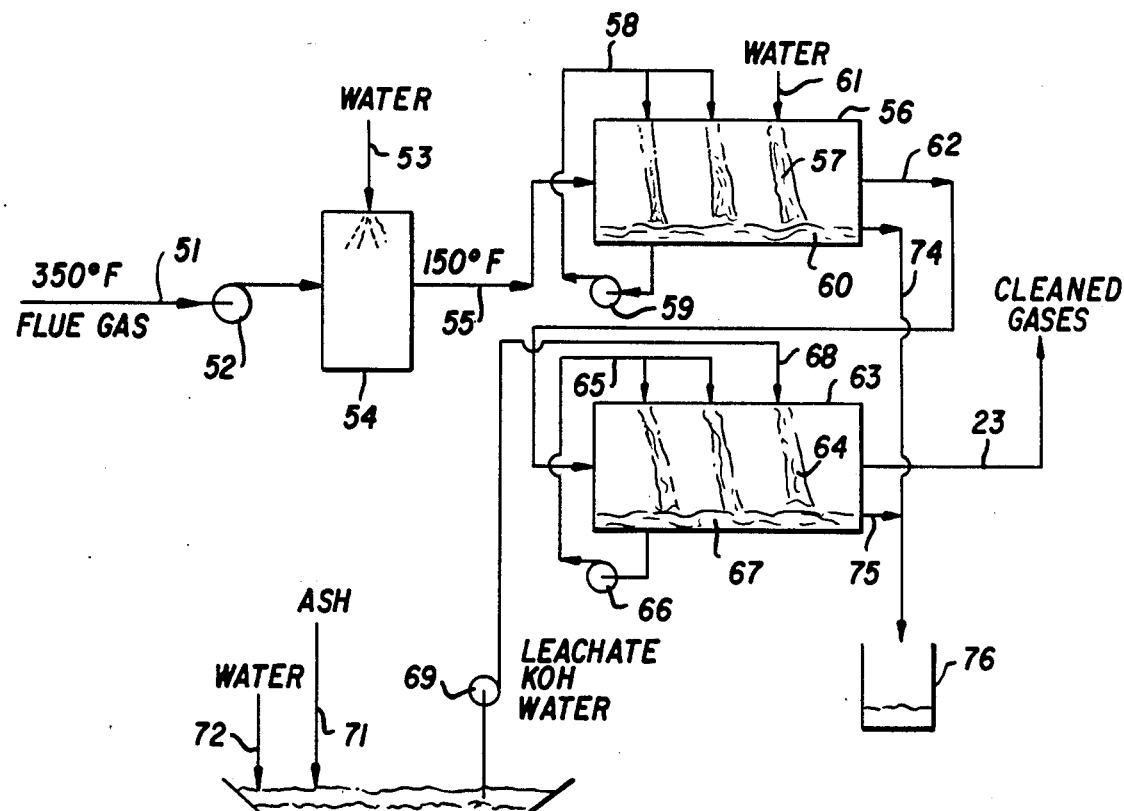
FIG. 5 is a flowsheet showing one embodiment of the process of the present invention using ash leachate as a scrubbing liquid to remove noxious compounds from an industrial combustion flue gas effluent.

Referring now to FIG. 5, there is shown a flowsheet which illustrates one embodiment of a suitable process which utilizes the long residence time according to this invention. An industrial effluent combustion flue gas 51, enters the process at a temperature of about 350 degrees F. This gas stream contains noxious components such as nitric oxide, nitrogen dioxide, carbon monoxide, carbon dioxide and sulfur dioxide. The composition of the gas stream is principally nitrogen with an oxygen content of 4 to 10%. The carbon dioxide content ranges between 8 and 12%, and the other noxious components are present in amounts ranging between 20 and 400 parts per million (ppm).

The pressure of the flue gas is increased by use of a fan 52 to overcome the resistance through the remainder of the apparatus and to provide the necessary inflation pressure where inflatable structures are utilized. A direct spray of water 53 would be utilized in an enclosure 54 to evaporatively cool the gas stream to a suitable temperature for the materials selected for the scrubber enclosure, in this case approximately 150 degrees F. The cooled gas stream 55 enters the first stage of the scrubber in which a liquid, either by means of spray or flooded porous media 57 or a combination thereof, is utilized to remove most of the sulfur dioxide and a portion of the nitrogen dioxide.

Liquid 58 is principally water and is fed to the scrubber by pump 59 which recirculates liquid 58 from the basin 60 of the scrubber 56. Fresh water 61 is fed to the latter stages of the scrubber 56 to provide maximum removal of the noxious components. The quantity of water added must be sufficient to overcome any evaporation within the scrubber and to dilute the concentration of nitric and sulfuric acid which results from scrubbing out the nitrogen and sulfur dioxides. The partially cleaned gas stream 62 then is fed to a second scrubber 63 in which liquid 65 is again contacted by the partially cleaned gas stream 62 by suitable porous media 64. The liquid 65 is recirculated by pump 66 from the basin of the scrubber 67. Liquid 65 comprises principally water, and containing a mixture of potassium hydroxide and other alkaline earth hydroxides and the chemical products which result from the reaction of the hydroxides and the noxious components of the gas stream, such as sulfates and nitrates.

Scrubbing liquid 68 is fed to the latter stages of the scrubber 63 by pump 69 from a leaching apparatus 70. Leaching apparatus 70 is constructed from a suitably lined dug-out pit and is utilized to leach the soluble reactive components from combustion ash 71 taken from the bottom ash collected from the combustion chambers (not shown) and the fly ash recovered by the air pollution control system (not shown). Water 72 is added to the leaching apparatus 70. The soluble reactive components is mostly potassium hydroxide with a total hydroxide concentration equivalent to 2 to 10% potassium hydroxide, typically 4%.

The excess accumulated liquids 74 and 75 leaving the first scrubber 56 and from the second scrubber 63, respectively, is transferred to a collection system 76. This collected liquid can be used as a liquid fertilizer either in its dilute state or by evaporative concentration.

For a typical boiler as described above, two such one acre apparatuses would be utilized, one for use with water, the second for use with leachate. Liquid rates in each scrubber would be about 6,000 gallons per minute at a low pressure of less than 10 pounds per square inch.

Figure 6:
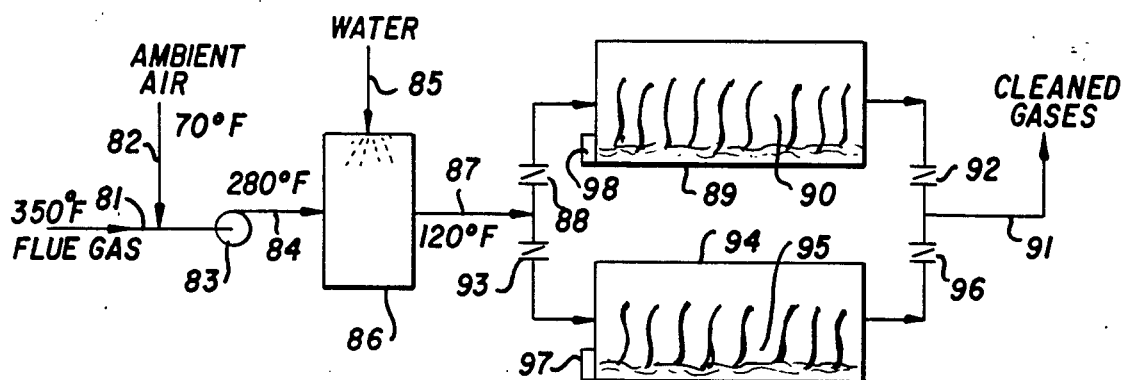
FIG. 6 is a flowsheet showing another embodiment of the process of the present invention using growing plants to remove noxious compounds from an industrial combustion flue gas effluent.

Another embodiment of the process of the present invention utilizing growing plants is shown in the flowsheet of FIG. 6. Flue gas 81 similar to that described above can be mixed with ambient air 82 if necessary to increase the oxygen concentration to a suitable level for growing plants, for example 9%. This addition of air will also lower the temperature and the humidity of the gas stream 84. An evaporative cooler 86 further lowers the temperature to about 120 degrees F. A fan 83 is provided to increase the pressure of the flue gas mixture being treated. The gas stream 87 is diverted by dampers 88 into one of the parallel scrubbing trains 89. Growing plants 90, such as fruit or ornamental trees, shrubs, or grains, take up nitrogen, sulfur and carbon oxides. The cleaned gas 91 would exit through open damper 92.

When the plants are full grown and unable to take up further gases, the gas stream 87 is diverted by means of closed damper 88 and open damper 93 into the second scrubber train 94 containing freshly planted plants or trees 95. Planting and initial growth may be carried out during the period that scrubber train 89 is in use. The plants 95 then take up the noxious oxides and the clean gas 91 exits through open damper 96 with damper 92 now closed. Plants 95 in train 94 can now be harvested and new plants started so as to be ready when the cycle is repeated. Each enclosure is provided with appropriate means 97, 98, respectively, for entering or exiting the enclosure for planting or harvesting purposes. Since the oxides tend to concentrate in the leaves and roots, the stems and branches can be used as fuel in the combustion system and the leaves and roots can be used as mulch to provide fertilizer and organics for agricultural purposes.

In this example, the dilution air 82 increases the total volume which must flow through the scrubbers 89, 94. Using the same combustion flue gas example as shown above, the area of each scrubber would be increased by 50% and would thus be 1½ acres each. No circulating liquid system is required, although a drip or light spray irrigation system could be incorporated to stimulate plant growth.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process utilizing growing plants to remove noxious components from gaseous streams comprising the steps of:
   providing a plurality of enclosures, each of which includes growing plants for removing noxious components from said influent gas stream prior to discharge;
   providing inlet and outlet means associated with each enclosure for introducing said gaseous stream being purified and for discharging said purified gaseous stream to the atmosphere;
   providing damper means for periodically swiching from one of said enclosures to another of said enclosures;
   introducing said influent gas stream into a first enclosure through said damper means;
   contacting said influent gas stream with said growing plants for a sufficient time to remove the noxious components in said gas stream and concomitantly permitting the plants to grow to a size where it can be harvested;
   discharging said purified gas stream to the atmosphere;
   switching said influent gas stream to a next enclosure, harvesting said grown plants from said first enclosure, and replacing said removed grown plants with smaller ones; and
   repeating the cycle.

2. The process defined by claim 1 wherein the influent gas is first cooled to a predetermined temperature by direct cooling with sprays of water.

3. The process defined by claim 1 wherein the influent gas is cooled by indirect exchange of heat between the influent gas and a cooling medium, such as ambient air or cooling water.

4. The process according to claim 1 further including the step of introducing clean air into said influent gas stream.

5. The process defined by claim 1 wherein blower means are provided for increasing the presssure of the influent gas entering said enclosure.

6. The method defined in claim 1 wherein the residence time is at least 1 minute.

7. The method defined in claim 1 wherein the residence time is from about 1 minute to about 20 minutes.

8. Apparatus for removing noxious components from gaseous streams utilizing growing plants comprising:
   a plurality of enclosures, each of which includes growing plants for removing noxious components from said influent gas stream prior to discharge, each of said enclosures being of sufficient size to provide a long residence time of said influent gas stream;
   inlet and outlet means associated with each enclosure for introducing said gaseous stream being purified and for discharging said purified gaseous stream to the atmosphere;
   means for periodically switching said inlet means for each enclosure to enable passage of said influent gas stream from one enclosure to another enclosure to permit growing of said plants within each said enclosure; and
   means provided in said enclosures for permitting harvesting of said plants after reaching a predetermined size and for permitting replacement of said harvested plants.

9. The apparatus defined in claim 8 further including a water spray means positioned adjacent said switching means to reduce the temperature of the influent gas stream.

10. The apparatus defined by claim 8 wherein the enclosure is constructd of a rigid or flexible sheeting material supported by an internal or external rigid frame.

11. The apparatus defined by claim 8 wherein the enclosure is constructed of an inflatable flexible sheeting material in which the inflation is provided by the pressure of the inlet gas stream and the inflation controlled by a suitable restriction or control device at the outlet of the apparatus.

12. The apparatus defined in claim 8 wherein the base of the enclosure includes a pit dug provided in the ground.

* * * * *